US011580762B2

(12) United States Patent
Rizvi et al.

(10) Patent No.: US 11,580,762 B2
(45) Date of Patent: *Feb. 14, 2023

(54) TRAINING A CARD TYPE CLASSIFIER WITH SIMULATED CARD IMAGES

(71) Applicant: THE TORONTO-DOMINION BANK, Toronto (CA)

(72) Inventors: Buturab Rizvi, Toronto (CA); Adrian Chung-Hey Ma, Toronto (CA); Ki Nam Choi, Toronto (CA); Alexandra Tsourkis, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/516,485

(22) Filed: Nov. 1, 2021

(65) Prior Publication Data

US 2022/0051008 A1    Feb. 17, 2022

Related U.S. Application Data

(63) Continuation of application No. 16/654,999, filed on Oct. 16, 2019, now Pat. No. 11,200,411.

(51) Int. Cl.
*G06V 30/40* (2022.01)
*G06N 20/00* (2019.01)
(Continued)

(52) U.S. Cl.
CPC ............. *G06V 30/40* (2022.01); *G06K 9/628* (2013.01); *G06K 9/6256* (2013.01); *G06N 20/00* (2019.01); *G06V 10/20* (2022.01)

(58) Field of Classification Search
CPC ...... G06V 30/40; G06V 10/20; G06K 9/6256; G06K 9/628; G06K 9/00442; G06K 9/00463; G06K 9/00456; G06K 9/00483; G06K 9/3233; G06K 9/00288; G06K 9/00469; G06K 9/325; G06K 9/46; G06K 2209/27; G06K 7/1417; G06K 9/00281; G06K 9/00536; G06K 9/00624; G06K 9/18; G06K 9/20; G06K 9/228; G06K 9/6267; G06K 2209/25; G06T 2207/30176;
(Continued)

(56) References Cited

U.S. PATENT DOCUMENTS 5,689,620 A  * 11/1997  Kopec ................... G06K 9/6256
                                                        382/187
6,243,724 B1 *  6/2001  Mander .................... G06F 16/34
                                                        715/810
(Continued)

*Primary Examiner* — Manav Seth
(74) *Attorney, Agent, or Firm* — Patent Capital Group

(57) ABSTRACT

A computer model to identify a type of physical card is trained using simulated card images. The physical card may exist with various subtypes, some of which may not exist or be unavailable when the model is trained. To more robustly identify these subtypes, the training data set for the computer model includes simulated card images that are generated for the card type. The simulated card images are generated based on a semi-randomized background that varies in appearance, onto which an identifying marking of the card type is superimposed, such that the training data for the computer model includes additional randomized sample card images and ensure the model is robust to further variations in subtypes.

20 Claims, 5 Drawing Sheets

(51) Int. Cl.
 *G06K 9/62* (2022.01)
 *G06V 10/20* (2022.01)
(58) Field of Classification Search
 CPC . G06T 2207/20081; G06T 2207/20084; G06T 7/00; G06T 7/251; G06N 3/08; G06N 20/00; H04N 1/00734; G06Q 20/3276; G06Q 20/409; G06Q 20/387; G06Q 30/016; G06F 16/93; G06F 16/35; G06F 40/186; G06F 16/285; G06F 40/279; G06F 16/258; G06F 40/106; G06F 40/263
 See application file for complete search history.

(56) References Cited

U.S. PATENT DOCUMENTS

| | | | | |
|---|---|---|---|---|
| 7,552,381 B2* | 6/2009 | Barrus | ............... | H04N 1/2179 715/845 |
| 8,194,933 B2* | 6/2012 | Lei | ............... | G06K 9/6247 382/209 |
| 8,418,055 B2* | 4/2013 | King | ............... | H04N 1/00307 707/711 |
| 8,442,319 B2* | 5/2013 | Sarkar | ............... | G06K 9/6256 382/164 |
| 8,577,118 B2* | 11/2013 | Nepomniachtchi | .. | G06V 30/166 382/137 |
| 8,831,329 B1* | 9/2014 | Kumar | ............... | G06K 9/6269 235/382 |
| 8,929,640 B1* | 1/2015 | Mennie | ............... | G07D 11/30 382/137 |
| 8,958,626 B1* | 2/2015 | Mennie | ............... | G07D 11/30 382/137 |
| 9,070,183 B2* | 6/2015 | Kumar | ............... | G06V 30/416 |
| 9,152,860 B2* | 10/2015 | Cervin | ............... | G06V 30/194 |
| 9,171,205 B2* | 10/2015 | Penna | ............... | G06V 30/412 |
| 9,298,979 B2* | 3/2016 | Nepomniachtchi | ............... | H04N 1/00718 |
| 9,569,796 B2* | 2/2017 | Wang | ............... | H04N 5/2257 |
| 9,779,063 B1* | 10/2017 | Dykema | ............... | G06F 40/103 |
| 9,904,956 B2* | 2/2018 | Wang | ............... | G06V 30/224 |
| 10,275,516 B2* | 4/2019 | King | ............... | G06F 16/35 |
| 10,474,890 B2* | 11/2019 | Hassanzadeh | ....... | G06V 30/224 |
| 10,482,174 B1* | 11/2019 | Goodsitt | ............... | G06V 10/82 |
| 10,534,954 B2* | 1/2020 | Kaehler | ............... | G06V 40/172 |
| 11,200,411 B2* | 12/2021 | Rizvi | ............... | G06K 9/6256 |
| 2006/0230004 A1* | 10/2006 | Handley | ............... | G06V 10/23 706/12 |
| 2012/0143760 A1* | 6/2012 | Abulafia | ............... | G06Q 20/40 235/380 |
| 2013/0290036 A1* | 10/2013 | Strange | ............... | G06Q 40/08 705/4 |
| 2013/0297353 A1* | 11/2013 | Strange | ............... | G06V 30/412 705/4 |
| 2014/0052636 A1* | 2/2014 | Mattes | ............... | G06V 10/40 705/44 |
| 2014/0232889 A1* | 8/2014 | King | ............... | H04N 1/00758 348/211.9 |
| 2016/0283787 A1* | 9/2016 | Nepomniachtchi | ............... | H04N 1/00734 |
| 2019/0213408 A1* | 7/2019 | Cali | ............... | G06V 30/245 |
| 2022/0251660 A1* | 8/2022 | Ellinor | ............... | A61K 35/33 |

\* cited by examiner

TRAINING A CARD TYPE CLASSIFIER WITH SIMULATED CARD IMAGES

CROSS-REFERENCE TO RELATED APPLICATIONS

This application is a continuation of U.S. application Ser. No. 16/654,999, filed Oct. 16, 2019, the contents of which are hereby incorporated by reference.

BACKGROUND

This invention relates generally to training computer models for recognizing information about cards, and particularly for recognizing a card type having unknown subtypes.

Electronic payments and electronic wallets for storing payment information typically require a user to enter information about the user's payment details and other information to complete a payment. In addition to payment information, physical wallets often hold gift cards, loyalty cards, and other physical cards holding information for a user. To effectively use this information in an electronic wallet, users often manually enter this information into an electronic wallet application on a client device. Some solutions attempt to capture a card image of a physical card and analyze the card to determine, e.g., numbers on the face of the card with character recognition. For wallet applications to easily and readily intake the actual contents of a wallet, however, these typically must also identify more than numbers or other user information (e.g., the cardholder name). For example, cards may have various different types associated with different entities, such as banks, merchants or organizations. While payment cards may often have a similar structure (e.g., 16 numerical digits, cardholder name, expiration month and year, etc.), other card types may have different types of information, and cards having the different types may have the same information. Accordingly, the type of information on the card may be an unreliable way to identify the type of card (i.e., the associated entity or use of the card). For example, loyalty cards associated with different entities may each include a user's name in addition to ten numerical digits. Accordingly, identifying a name and ten numerical digits may be insufficient to identify a card type and to which entity the card is associated. In addition, entities may issue additional cards at any time with varying different subtypes (e.g., of the same type corresponding to the same entity). As a result, training a system to identify only existing subtypes of that card may fail to correctly identify the card type when new subtypes are issued by an entity.

SUMMARY

A client device captures a card image of a card and automatically identifies the card type by applying a trained computer model to the captured card image. The computer model may comprise various types of trained model, such as a neural network, particularly a convolutional neural network or other network particularly configured to analyze images. To identify subtypes of a particular card type, including subtypes of the type of card for which examples are not available or that do not exist at the time the model is trained, the computer model is trained with simulated images that include an identifying marking of the card type. The identifying marking is a mark or other symbol, typically associated with an entity associated with the type, that is expected to appear on various subtypes of the image. For example, for a card type identified with a merchant, the identifying marking may be a trademark, symbol or identifier associated with the merchant that is expected to be present on varying subtypes. The identifying marking is added to semi-randomized card image backgrounds to generate simulated card images that anticipate how such subtypes may appear when they are captured by the client device. To train the computer model, the simulated card images are added to a training set that used in the model training. In some embodiments, the training set includes captured card images from known subtypes of the card type. The computer model may be a classifier for the particular card type configured to output a likelihood that an unknown scanned card belongs to the card type, or the model may be multi-class classification model that may predict the likelihood the card belongs to one of several card types. In this approach, rather than training the model to attempt to directly recognize the identifying marking, the identifying marking is thus integrated into examples that permits the identification of the card type despite that various subtypes may be scanned by the mobile device for which no examples were used during training of the computer model.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
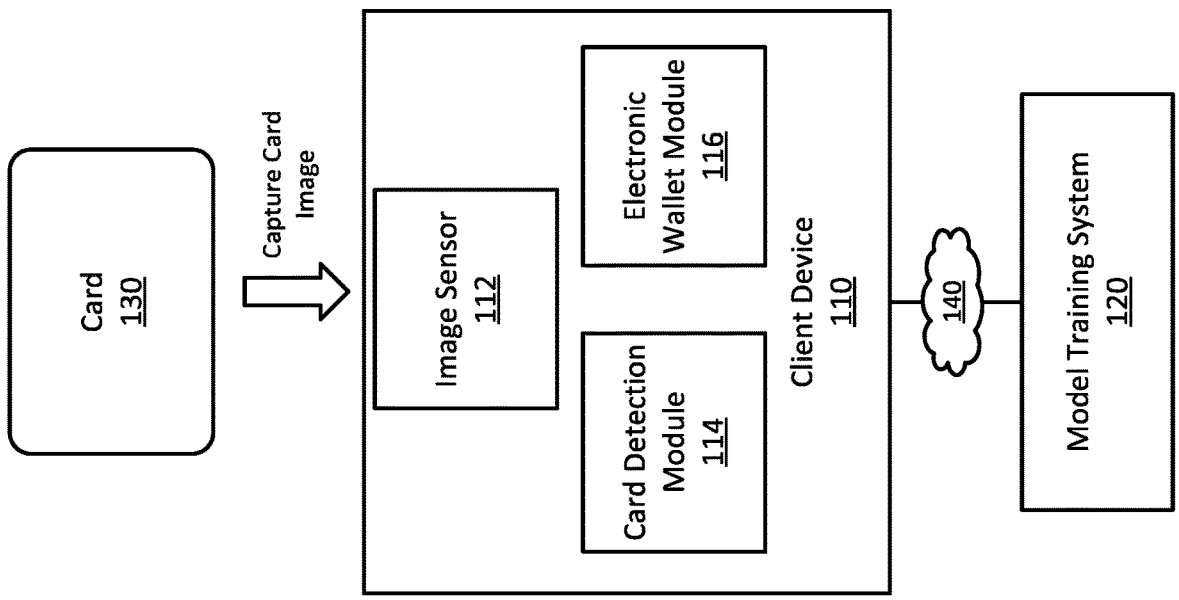
FIG. 1 shows an example embodiment in which a client device may capture a card image of a card and apply a computer model to identify the card type of the card.

FIG. 1 shows an example embodiment 100 in which a client device 110 may capture a card image of a card 130 and apply a computer model to identify the card type of the card 130. The client device 110 may be a portable or other mobile computing device that may be used to capture an image of the card 130 and apply trained computer models to identify the card type. The client device 110 may communicate with a model training system 120 via a network 140 to receive computer models (and updates thereto) used to identify the type of a card for a captured card image. While the card detection module 114 is shown in FIG. 1 and described below as performing determination of a card type, in other embodiments the client device 110 may send the captured card image to the model training system 120, which may perform the functionality of the card detection module 114 to identify the card type and return the determined card type to the client device 110.

The card 130 is a physical card, typically of plastic, metal, or paper, that includes information useful to the user for which the client device 110 may store the information in an electronic wallet, for example for payment or user account identification. For example, the card 130 may be a credit or charge card for transaction payment, identification card, or may be a card associated with a particular entity and is not intended for payment. These may include cards indicating membership to a particular club, cards providing affiliate or membership information, and so forth. Typically, the card 130 has dimensions for convenient storage in a physical a wallet, such as the dimensions for credit cards conforming to International Standards Organization standard ISO/IEC 7810:2003.

The different entities and purposes of these cards are described here as different 'types' of these cards. For example, a library card indicating a user's account number with a specific library is one type of card, while a loyalty card for a particular merchant is another type of card. Within a given card type, there may be differing subtypes of cards. For example, the specific library may give a user a choice of which card to use—a card showing a picture of the library, a card showing a local artist's drawings, or a plain card that just indicates the library's name and location. While each of these cards may appear relatively different, particularly when analyzed by automated image analysis techniques, they all correspond to the same functional type—a card for this user to this library. In addition, different types of cards may be issued over time by an entity, such that new subtypes of cards may appear over time. For example, the library may issue a new subtype of card in October to celebrate Halloween, or issue a new card to commemorate the success of a different local artist. Typically, however, the cards of the same type may include one or more identifying markings corresponding to the card type (e.g., for the entity issuing the card) and may include similar information on the card, such as an account number or user information.

The card may also include various information that varies according to the card type, such as a series of numerical digits, an account holder's name, an expiration date, and so forth.

Though described as typically applying to cards intended for storage in a wallet, different types of cards of different sizes may also be used in various embodiments.

The client device 110 shown in the embodiment of FIG. 1 includes an image sensor 112, a card detection module 114, and an electronic wallet module 116. The image sensor 112 is a camera or other imaging device configured to capture a card image of the card 130. In various embodiments, the camera may capture a single image, or may capture a series of images (e.g., a video feed) and select an image from the series as the card image. The user may interact with an application on the client device 110 controlling the image sensor 112, such as the electronic wallet 116, to orient the client device 110 and control when the image sensor 112 captures the card image. In one embodiment, a user interface displays a video captured by the image sensor 112 in real time and overlays a bracket or other guidance element to indicate an area within the image to guide the location of the user's capture of the card 130 within the image. In this way, the user may orient the client device 110 to capture an image having the card 130 within the field of view of the image sensor 112 when capturing the image.

The card detection module 114 receives the card image from the image sensor 112 and applies a computer model to the card image to identify the card type. Before inputting the card image to the model, the card image may be preprocessed to standardize and clean the image for the model. For example, the processing may isolate the portion of the image including the card 130 by removing areas of the image that do not include the card. In addition, the card may have been captured from various angles or rotations. Accordingly, corners of the card may be identified (automatically or as designated by the user), to crop the image and a transformation may be applied to consistently orient the card within the image to be used for the computer model. To detect the edges and corners of the card, the card detection module 114 may apply an edge detection algorithm to the image. This transformation may include an affine transformation that may translate, scale, rotate, or shear the captured card image. In addition, the card image may also be filtered to account for various lighting and image capture conditions.

In some embodiments, the card detection module 114 also analyzes the image to identify information presented on the card to be included as an input to the card type detection module. For example, the card detection module 114 may perform optical character recognition (OCR) on the card image to identify characters and numbers on the card as well as other information. The characters and numbers may then be analyzed to identify types of data represented by the characters and numbers. For example, the numbers may be analyzed to identify, e.g., if the numbers are a string of consecutive numbers and the number thereof (e.g., a ten-digit number). Likewise, two pairs of numbers separated by a slash may be identified as a date (e.g., October 25). This information may be provided to the electronic wallet module 116 to automatically populate information about the type of card. In addition, the type of information may be included with the card image as a feature of the card to identify the card type.

To identify the card type, the card detection module 114 applies the card image, as well as any identified information types, as features of the card 130 provided as an input to a computer model identifying the card type. The card type determined by the card detection module 114 is provided to the electronic wallet module 116 in addition to any additional identified information (e.g., numbers, dates, name), for the electronic wallet 116 to add the card 130 to the set of cards maintained for the user by the electronic wallet module 116. The card detection module 114 also receives and updates the computer model for identifying card types from the model training system 120.

In various embodiments, the card detection model 114 provides the captured card image to the model training system 120 and the model training system 120 applies the model to the card image and returns the card type and other information to the card detection module 114.

In addition, the card detection module 114 may provide the captured card image to the model training system 120 to add additional card images for training the model training system 120. In particular, the card detection module 114 may provide the captured card image to the model training system 120 when the user affirms or rejects a card type suggested to the user by the electronic wallet module 116. These user selections may be used to provide positive or negative examples to the model training system 120, or to determine a rate of true positives to false positives.

The electronic wallet module 116 may control the image sensor 112 and card detection module 114 to capture card images, identify card types, and store an electronic wallet for the user of the client device 110. The electronic wallet may include information from cards to become a substitute for a physical wallet that may otherwise be carried by the user. Accordingly, the electronic wallet module 116 records information about the various cards that have been captured by the image sensor 112 or manually entered by the user. When the card is entered, the electronic wallet module 116 identifies a type of the card, such as an associated entity and other information about the card. The electronic wallet module 116 may instruct the image sensor 112 to capture an image of the card, and may provide a user interface for the user to view while capturing the card image. For example, the electronic wallet module 116 may show a video feed on a display of what is being captured by the image sensor 112 for the user to orient the card and designate when to capture the card image. When the card image is captured, the user interface may display the captured card image and request the user to identify the portion of the image that corresponds to the card, for example by designating corners of the card within the captured image. In other examples, the card detection module 114 may apply an edge or corner detection algorithm to automatically determine the corners or edges of the card in the image, which may be confirmed by the user on the user interface.

When the card image is captured, the electronic wallet module 116 then may provide the card image to the card detection module 114 and receive a predicted card type from the card detection module 114. In addition, the card detection module 114 may also provide information identified from the card (e.g., detected digits, character strings, etc.). For each type of card, the electronic wallet module 116 may store a data structure describing fields of information associated with that type of card. For example, a library card for a particular library may include an account number and a card member's name. Based on the card type, the electronic wallet module may automatically associate the card information with the fields of information for that type of card, for example a string of digits and a string of characters on a card identified with the particular library may be determined to be the fields of account number and cardholder name.

Accordingly, the electronic wallet module 116 in conjunction with the card detection module 114 allows the user to capture images of many different cards 130, automatically identify the type of card and populate information of the card in the electronic wallet and store the card information. The stored card information may then be used for retrieval by the user and may be used in conjunction with other applications or systems (not shown) to authorize actions, complete payments, and otherwise use the information from the scanned cards 130.

Figure 2:
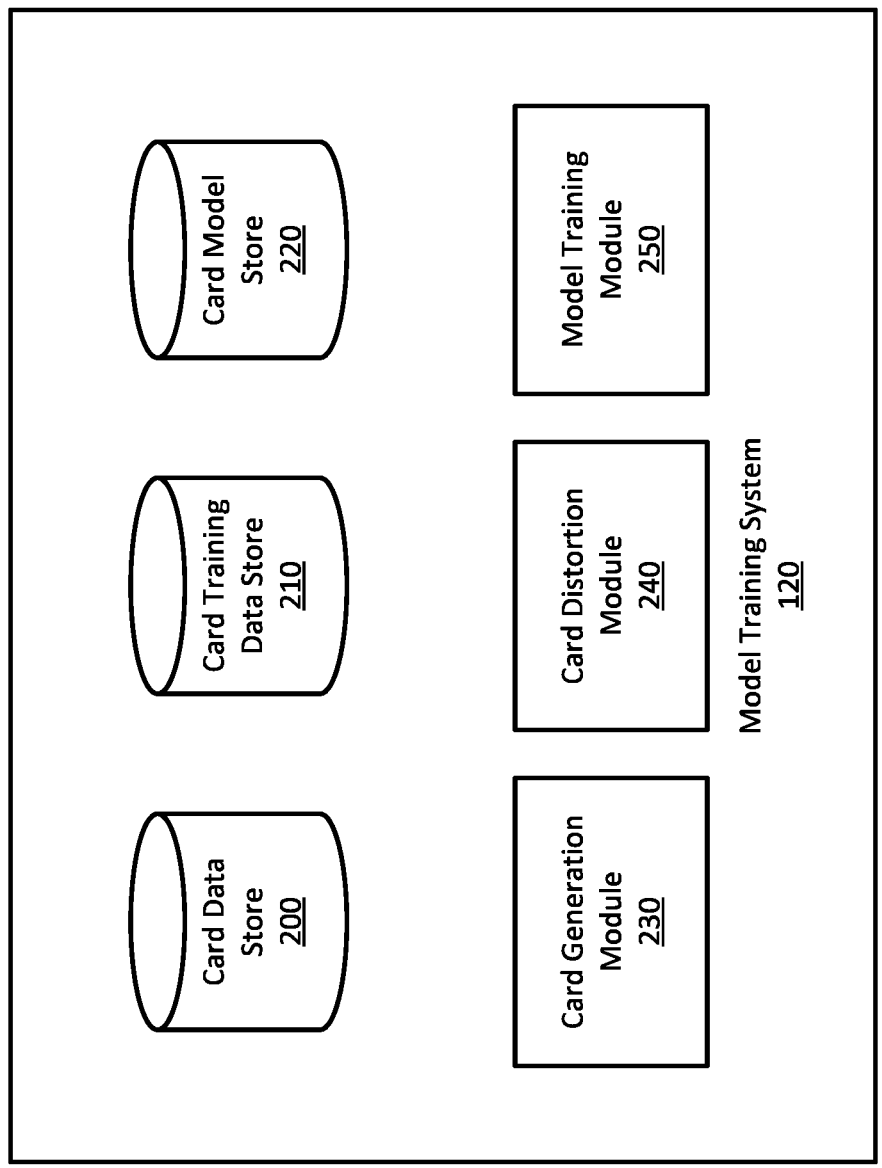
FIG. 2 shows components of an example model training system according to one embodiment.

FIG. 2 shows components of an example model training system 120 according to one embodiment. The model training system includes various data stores and computing modules for training a computer model for identifying card types based on a card image, particularly card types having a variety of subtypes. In this example, the model training system 120 includes a card data store 200, a card training data store 210, and a card model store 220. Various modules that may assist in the generation of training of the computer model include a card generation module 230, a card distortion module 240, and a model training module 250. In these examples, the model training system 120 is illustrated without additional components that may be included in practiced embodiments, such as additional distributed systems, data stores, networking components, and so forth. The card identification models trained by the model training system 120 may be sent to client device 110 for application by a card detection module 114 to identify cards 130.

The card data store 200 includes a set of card images of card images captured by client devices 110 or otherwise collected for the model training system 120. These images may be labeled as various particular card types, and may be further labeled as particular subtypes of a card type. As discussed above, captured card images may be sent from the client device to the model training system 120. When received by the model training system 120, these may be saved to the card data store 200 to increase available card examples for a card type.

The card generation module 230 and card distortion module 240 create a set of training data to be stored or designated in the card training data store 210. Each card image in the training in the training data store 210 may be labeled as a particular card type, such that the training data may represent a positive training set for the card type and used to train a model. The card generation module 230 generates simulated card images for the card type by creating semi-randomized images that may correspond to the card type and including identifying markings of the card type on the semi-randomized images, thus creating simulated images that may represent possible subtypes of the card type. The card distortion module 240 may use the card images, either of card images from the physically captured cards or from the simulated card images to further generalize the training images for the card type, further improving the robustness of the generated model with respect to that card type. The generation of the training data is further discussed below with respect to FIGS. 3-4.

The model training module 250 trains a computer model to identify a card type based on the training data for the card type in the card training data store 210. The training data includes one or more of the simulated card images generated by the card generation module 230. In various embodiments, the model training module may train different types of computer models, such as a classifier CNN to output a prediction that a given input image is a particular card type. The input card image may also include features describing the type of information present on a card image (e.g., number and type of characters or digits).

In some embodiments, the model training module 250 trains a computer model for each card type to be identified by the card detection module 114. The trained computer model may be stored to the card model store 220 and distributed to client devices 110 to update the computer models at the card detection module 114. In this situation, the computer model for each card type may be a binary classifier that indicates either the card image is likely to belong to the card type or is not. This likelihood may be represented as a percentage prediction that the card is of the card type. In this example, the positive training set may be the set of images labeled with the card type. The negative training set may be selected from among card images in the card training data store 210 that are associated with other card types. Various computer models may thus be generated for each card type, and to determine a card type for a given card image, the predictions from each classifier may be generated and ranked such that the highest prediction is suggested as the card type of the unknown card image.

In some embodiments, the model training module 250 trains a multi-class classifier that may generate a prediction with respect to several card types. The positive training set for each card type in the multitype classifier includes the training set labeled with that card type in the card training data store 210. The multi-class classifier may output a likelihood for each of the types in the classifier that the input card image belongs to that type.

In some embodiments, the positive training set for the trained classifier includes the captured card images from existing physical cards as well as the simulated card images. In other embodiments, multiple computer models may be trained for a single card type. In this example, one computer model may be generated for the captured card images, which may include one model for each identified subtype of the card type. An additional computer model may be trained based on the simulated card images. In this approach, card images that match subtypes in the training set may be more readily identified by the classifiers trained on existing card images, while card images that have a subtype that has not previously been included in the training data may be better identified as the card type based on the computer model trained on the simulated card images. This approach may permit the model to be robust with respect to both existing card subtypes and flexible enough to identify unknown card subtypes for a given card type.

Figure 3:
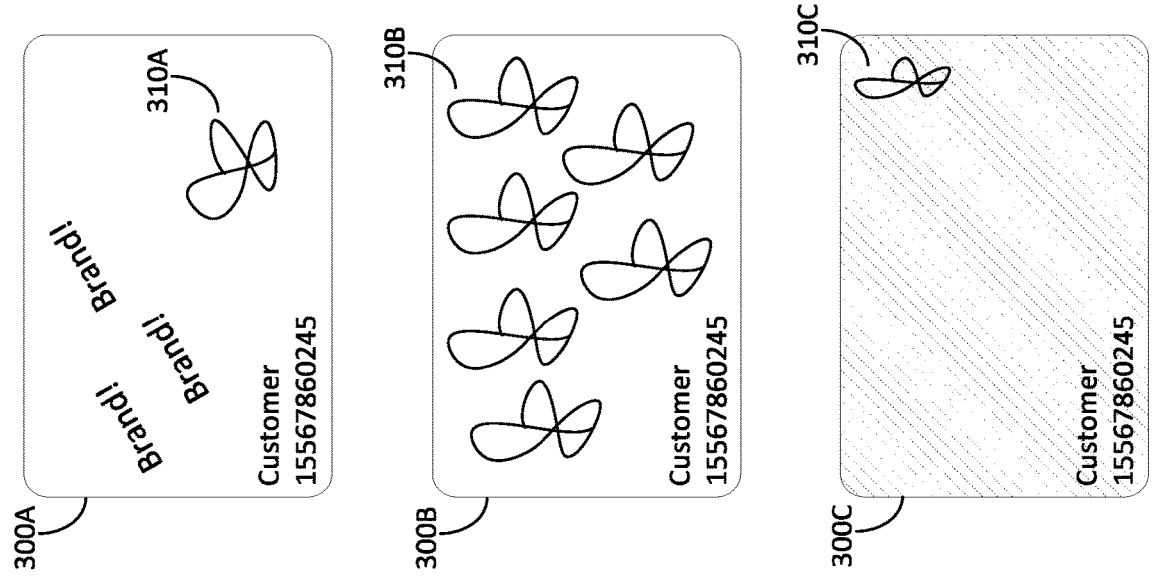
FIG. 3 illustrates example card images having different subtypes of a given card type, according to one embodiment.

FIG. 3 illustrates example card images having different subtypes of a given card type, according to one embodiment. To generate card types, the card generation module 230 uses an identifying marking of the card type that may be consistent across different subtypes of the card. For example, shown in FIG. 3 are various card subtypes 300A-C. In this example, each of the card subtypes differs from one another, but may represent a card type for the same entity. For example, this card type includes a customer name and an account number. The various subtypes have different words or phrases, backgrounds, and content. Each subtype, however, includes an identifying marking 310. In the first card subtype 300A, the identifying marking 310A along with the account number and customer name, along with the text "Brand! Brand! Brand!" In the second card subtype 300B, the customer name and account number appear with the identifying marking 310B, which is repeated several times across the face of the card. In the third card subtype 300C, the customer name and account number appear with the identifying marking 310C against a geometric background.

The card generation module 230 may determine what portion of the cards 300 constitutes the identifying marking 310 in various ways. Typically, the identifying marking is a symbol, logo, set of words, or other distinctive mark expected to be present on card subtypes for the card type. The identifying marking may be specified in some embodiments by an operator of the model training system 120. In other embodiments, the card generation module 230 identifies the identifying marking 310 by comparing images of different card subtypes to determine the features similar to each subtype. For example, the card generation module 230 may apply image processing techniques designed to match features across images, for example by characterizing portions of the images with keypoints or keypoint descriptors and determining matches between the images when various shifts, transforms, or other operations are performed to the images. For example, an inlier-based analysis may be used to determine a maximum number of matching keypoints after various transforms are performed on the images. When keypoints for a region match across different images, particularly across several subtypes, that region of the card image may be identified as the identifying marking 310 of the card type.

Figure 4:
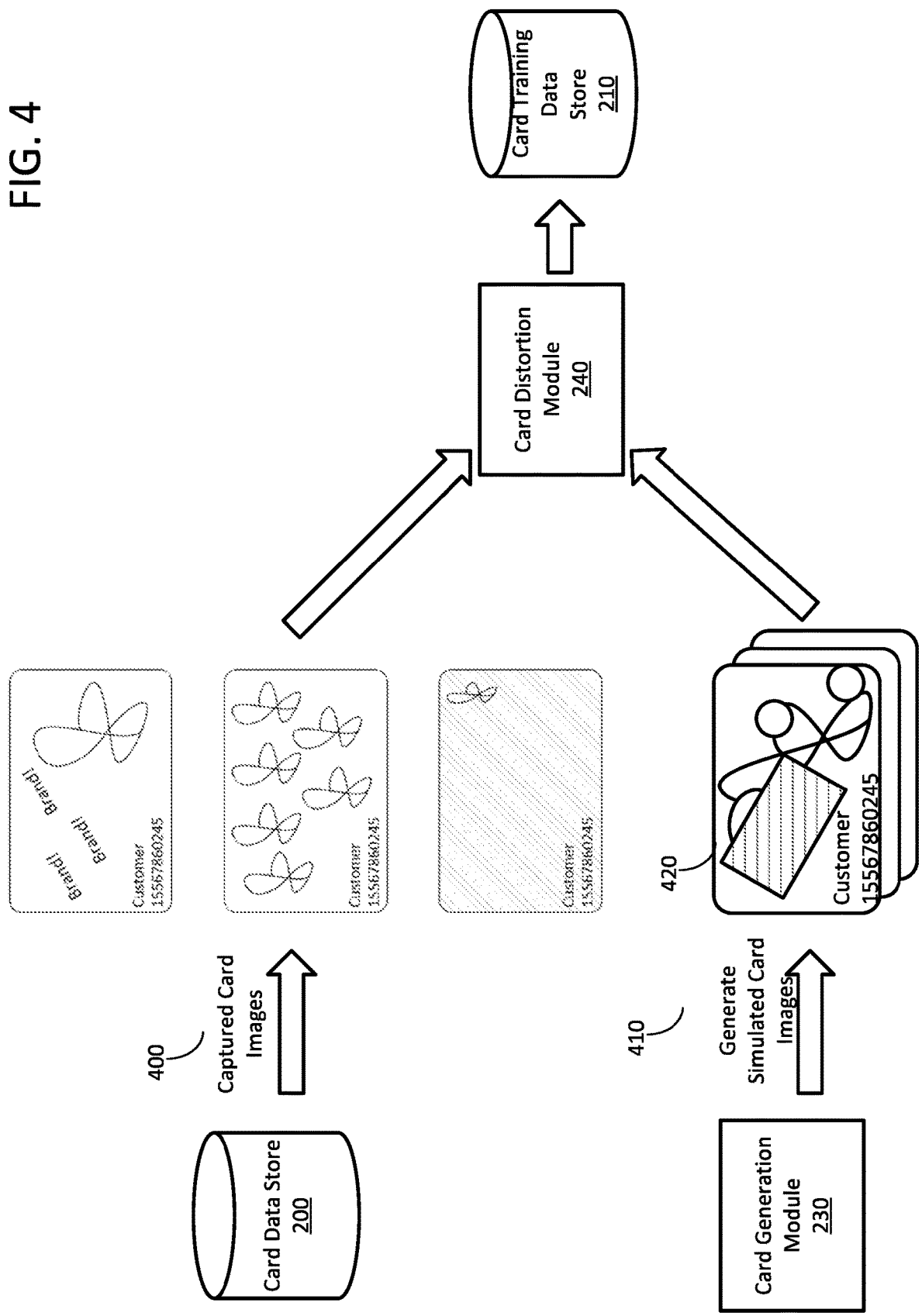
FIG. 4 shows the generation of card type training data according to one embodiment.

FIG. 4 shows the generation of card type training data according to one embodiment. In this example, the card training data may include captured card images 400 of the card type, which may be retrieved from the card data store 200. In addition, the card generation module 230 may generate 410 simulated card images 420.

To generate the simulated card images 420, the card generation module 230 creates semi-randomized backgrounds and superimposes the identifying marking on the background. The semi-randomized backgrounds are generated by randomizing various structured aspects of an image representing a card. The randomization may generate various patterns, images, colors, text, and other characteristics of a background. For example, the patterns may include different lines or shapes that may be applied to the background as the initial randomized background. At this point, the backgrounds may be generic with respect to the type of card. To customize the background with respect to the card type, the identifying mark is superimposed on the background to generate the simulated card images 420. The identifying mark may be superimposed by replacing the image content at the location at which it is superimposed, and in variations may be partially translucent when superimposed, such that the background may still be partially visible at the location of the superimposed identifying marking. The identifying mark in the various simulated card images may be placed at different, randomized locations on the simulated card images. In addition, the identifying mark may be rotated, stretched, spatial transformed, or otherwise have a transform applied to it before superimposing the identifying mark on the set of background card images. By generating the simulated card images, the training set for the card type may include card images that show possible variation of the card type, and permit models trained on the training set to be more robust to variation in card subtypes that do not appear in the captured card images (e.g., the card subtypes are unknown at the time the model is trained).

The card distortion module 240 may further distort the card images for the training set, including the captured card images 400 and the simulated card images 410. The distortions applied to the card images may be used to modify the card images before use in the training set (i.e., replacing the card image), or the distortions may generate additional card images after the distortions. These distortions may include a variety of image transformations or 'filters' to modify the card images. For example, these distortions may include one or more of rotation, flip, mirroring, color alteration, blur, cropping, displacement, grayscale conversion, stretching (horizontal and vertical) zoom, focus, static, or another type of image filter or transformation to the image. The distortions applied may also be a function of the consistency of image capture and conditions expected to be seen in card images captured by the client device 110. For example, if the preprocessing orients and crops the card image, the card images captured by client device 110 may be relatively consistent in orientation, size, and shape, such that the distortions applied to the card images for the training images also maintain orientation, size, and shape of the card images. In some embodiments, the card distortion module 240 is omitted (or otherwise does not process the card images), such that the captured card images and/or simulated card images are used as a training set without further distortion.

Figure 5:
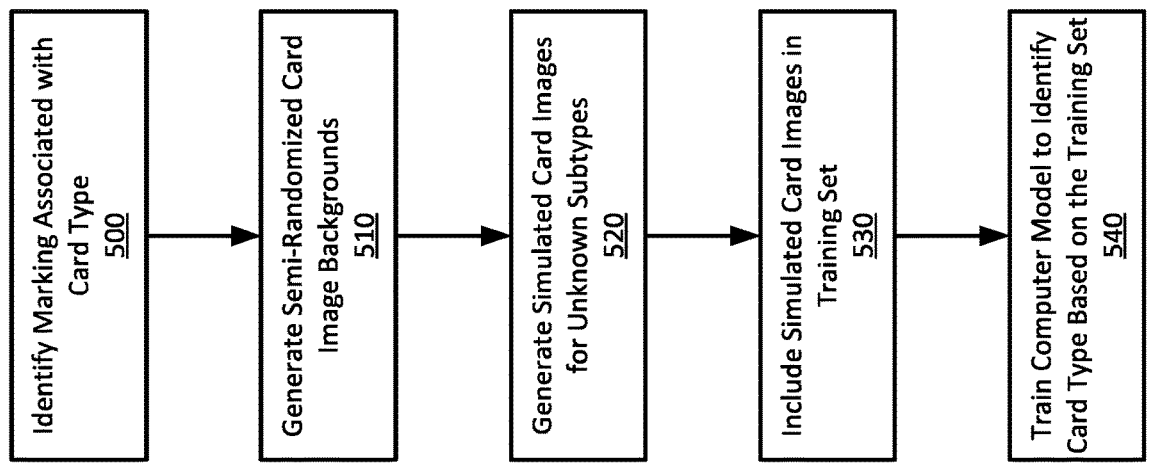
FIG. 5 shows an example process for training a computer model to identify a card type having unknown card subtypes according to one embodiment.

FIG. 5 shows an example process for training a computer model to identify a card type having unknown card subtypes according to one embodiment. This process may be performed, for example, by the model training system 120. Initially, the process identifies 500 an identifying marking associated with the card type. As discussed above, the identifying marking may be identified manually by an operator, or may be automatically determined by analysis of card images having known subtypes of the card type. To generate card images that simulate the unknown subtypes, the process next generates a set of semi-randomized card image backgrounds, which may vary in different characteristics and features that may appear on a card subtype. Next, the simulated card images are generated 520 by superimposing the identifying marking on each of the card background images, creating card images that include the identifying marking and vary from the known card subtypes. In addition, the simulated card images may also have various distortions applied to them, to introduce further variation that may be consistent with the images actually captured by client devices capturing card images. The simulated card images are included 530 in a training set for the card type, which may also include captured card images for the card type. Finally, the computer model is trained 540 based on the training set to receive a card image and output a likelihood that the card image belongs to the card type that the model was trained on. The computer model may be a multi-class classifier, such that multiple card types are trained simultaneously.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A system, comprising:
    a processor that executes instructions;
    a non-transitory computer-readable medium having instructions executable by the processor causing the processor to:
        generate a set of simulated card images by adding an identifying marking of a card type to a set of semi-randomized card image backgrounds, the set of simulated card images simulating unknown subtypes of the card type; and
        include the set of simulated card images in a training set of images for the card type, the training set for training a computer model to identify the card type with a card image based on the training set of images.

2. The system of claim 1, wherein the instructions further cause the processor to provide the computer model to a system configured to train the computer model using the training set of images for the card type.

3. The system of claim 1, wherein the instructions further cause the processor to generate the set of semi-randomized card image backgrounds.

4. The system of claim 1, wherein the instructions further cause the processor to identify the identifying marking of the card type.

5. The system of claim 4, wherein the identifying markings of the card type are determined by comparing features across known subtypes of the card type.

6. The system of claim 5, wherein the features compared across known subtypes include keypoints or keypoint descriptors using an inlier-based analysis to determine a maximum number of matching keypoints.

7. The system of claim 1, wherein the instructions to generate the set of simulated card images further comprises applying one or more distortions to the training set of images.

8. The system of claim 7, wherein the distortions are based on the consistency of image capture expected for card images to be classified by the computer model.

9. The system of claim 1, wherein the instructions to generate the set of simulated card images further comprises applying a transform to the identifying marking before adding the identifying marking to at least one of the card image backgrounds.

10. A method, comprising:
    generating a set of simulated card images by adding an identifying marking of a card type to a set of semi-randomized card image backgrounds, the set of simulated card images simulating unknown subtypes of the card type; and
    including the set of simulated card images in a training set of images for the card type, the training set for training a computer model to identify the card type with a card image based on the training set of images.

11. The method of claim 10, further comprising providing the computer model to a system configured to train the computer model using the training set of images for the card type.

12. The method of claim 10, further comprising generating the set of semi-randomized card image backgrounds.

13. The method of claim 10, further comprising identifying the identifying marking of the card type.

14. The method of claim 13, wherein the identifying markings of the card type are determined by comparing features across known subtypes of the card type.

15. The method of claim 14, wherein the features compared across known subtypes include keypoints or keypoint descriptors using an inlier-based analysis to determine a maximum number of matching keypoints.

16. The method of claim 10, generating the set of simulated card images further comprises applying one or more distortions to the training set of images.

17. The method of claim 7, wherein the distortions are based on the consistency of image capture expected for card images to be classified by the computer model.

18. The method of claim 10, generating the set of simulated card images further comprises applying a transform to the identifying marking before superimposing the identifying marking on at least one of the card image backgrounds.

19. A non-transitory computer-readable medium comprising instructions executable by a processor that cause the processor to:
   generate a set of simulated card images by adding an identifying marking of a card type to a set of semi-randomized card image backgrounds, the set of simulated card images simulating unknown subtypes of the card type; and
   include the set of simulated card images in a training set of images for the card type, the training set for training a computer model to identify the card type with a card image based on the training set of images.

20. The non-transitory computer-readable medium of claim 19 wherein the instructions further cause the processor to provide the computer model to a system configured to train the computer model using the training set of images for the card type.

* * * * *